United States Patent [19]

Weisman

[11] 4,360,083

[45] Nov. 23, 1982

[54] DISC BRAKE PROTECTIVE COVER PLATE

[75] Inventor: Roland E. Weisman, Wilmot, Wis.

[73] Assignee: International Harvester Co., Chicago, Ill.

[21] Appl. No.: 257,282

[22] Filed: Apr. 24, 1981

[51] Int. Cl.³ .............................................. F16D 65/00
[52] U.S. Cl. ................................ 188/218 A; 188/18 A; 188/72.5; 301/6 WB
[58] Field of Search ............... 188/218 A, 72.5, 18 A, 188/72.4, 71.5, 366, 368, 369, 73.31, 352; 301/6 E, 6 WB; 192/112

[56] References Cited

U.S. PATENT DOCUMENTS

| | | | |
|---|---|---|---|
| 2,837,178 | 6/1958 | Barnett | 188/72.5 |
| 3,064,764 | 11/1962 | Randol | 188/369 |
| 4,005,768 | 2/1977 | Bubnash et al. | 188/218 A |
| 4,155,601 | 5/1979 | Ito | 301/6 WB |
| 4,164,273 | 8/1979 | McElroy | 188/218 A |
| 4,282,952 | 11/1981 | Bartley | 188/18 A |

FOREIGN PATENT DOCUMENTS 1087549  2/1955  France ................... 188/369

Primary Examiner—Douglas C. Butler
Attorney, Agent, or Firm—D. K. Sullivan; F. D. AuBuchon

[57] ABSTRACT

A disc brake protective cover plate is mounted to a radial flange on a tractor loader wheel axle housing which is used for mounting multiple air-over-hydraulic, external drive caliper disc brake units thereto. The disc brake protective cover plate is in the form of a canister which has an open end slipping over the disc brake units into a hub of the tractor wheel. The cover plate protects feeder brake lines which are connected to a main disc brake unit and run externally alongside the radial flange to two servo disc brake units.

4 Claims, 4 Drawing Figures

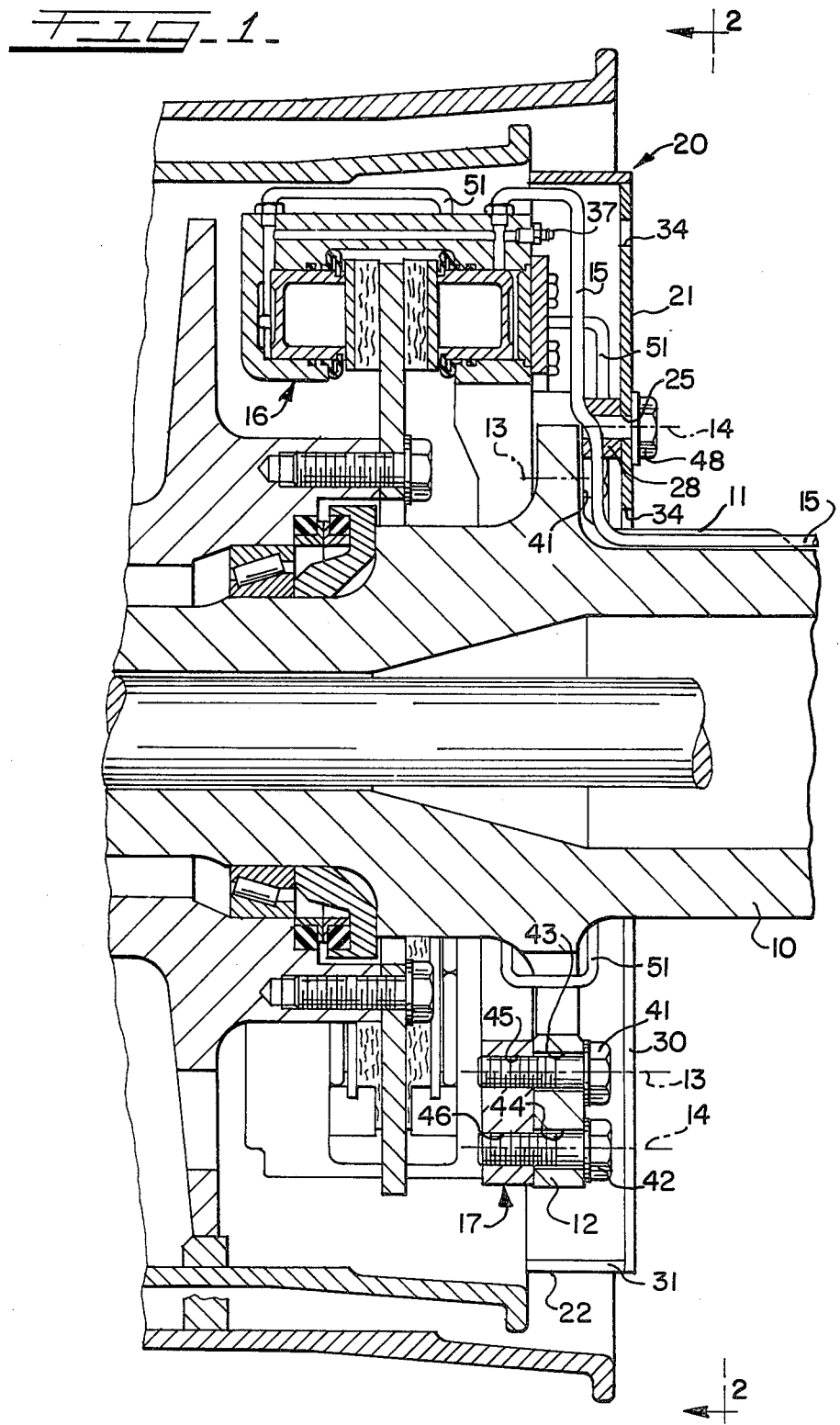

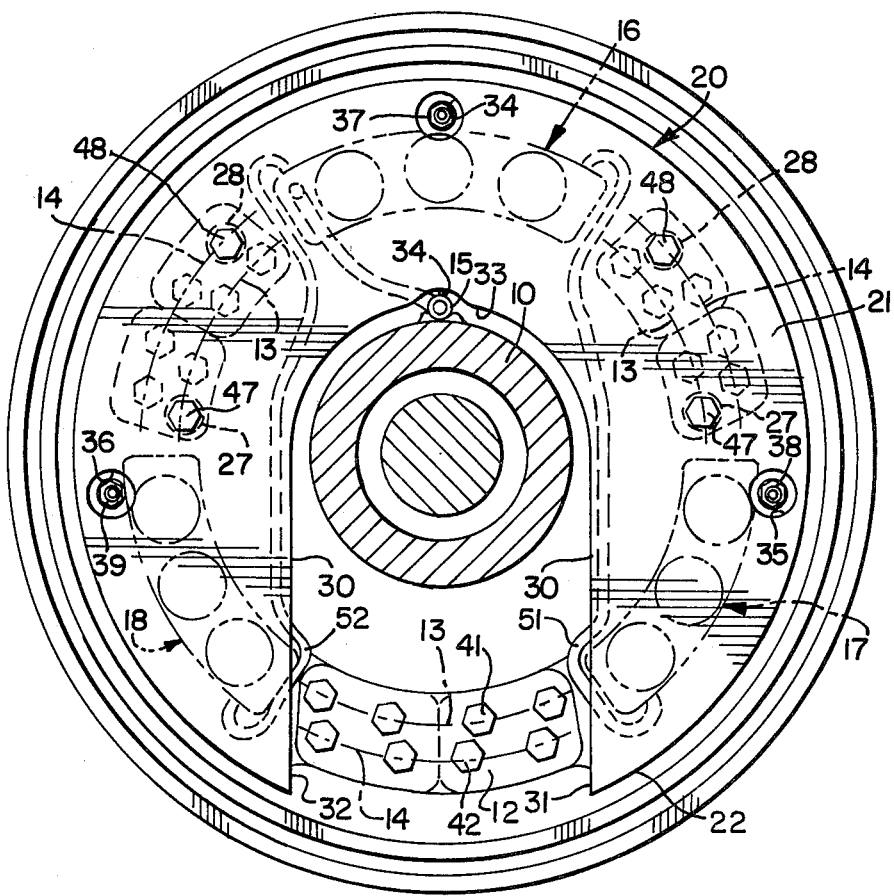
FIG_2

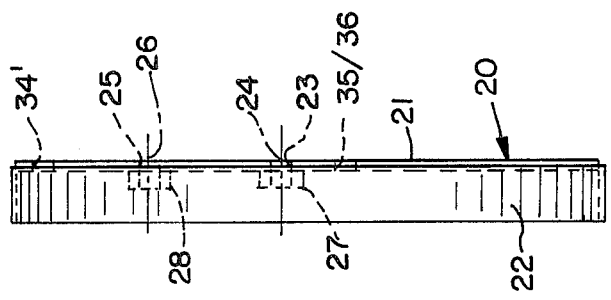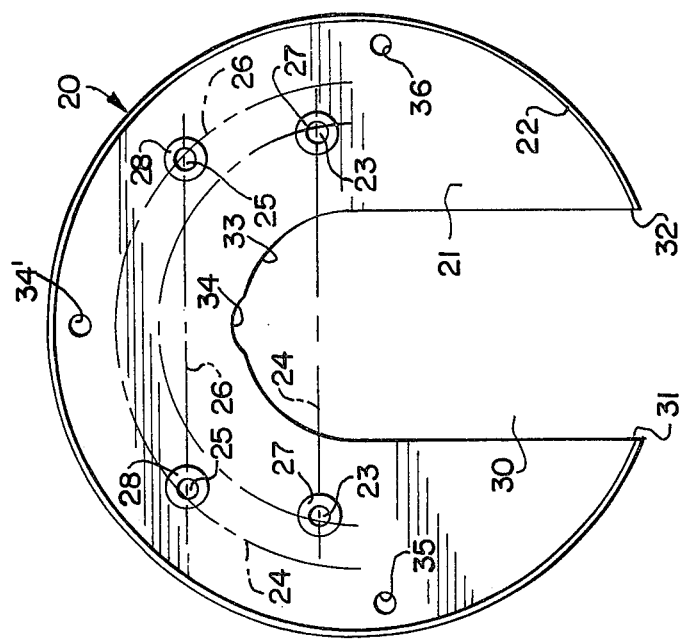

DISC BRAKE PROTECTIVE COVER PLATE

This invention relates to tractor loader vehicle service brakes and in particular to protective cover plates for wheels equipped with multiple air-over-hydraulic, external dry caliper disc brakes.

In tractor loader vehicles, which have wheels equipped with multiple air-over-hydraulic, external dry caliper disc brakes, each wheel may have three disc brake units spaced 120° apart around the disc, and each unit may have three brake apply piston on each side of the disc with an associated brake lining assembly. One unit is connected to a main hydraulic fluid brake line and the other two units feed from the one unit through respective branch hydraulic fluid feeder brake lines running along side the exterior of an annular flange mounting the units to the wheel axle housing. When the brake pedal is applied, a flow of compressed air is directed to an air cylinder within a power cluster. The air cylinder in turn acts upon a hydraulic cylinder within the power cluster and directs a flow of hydraulic brake fluid to each of the main brake lines servicing the one brake unit on each of the wheels, and sequentially the pressurized brake fluid passes into the branch feeder brake lines connected to the other two servo disc brake units on each wheel, consequently moving the power apply pistons on each side of the disc against the respective brake linings and forcing the linings against the disc.

The advantage with air-over-hydraulic, external dry caliper disc brakes, is the ease in accessibility when servicing is required. The brake linings may be replaced without removing the wheel. The disadvantages are that the brake units are not sealed from external contamination and that the external branch feeder brake lines are not protected from damage.

The disc brake protective cover of my invention overcomes the disadvantages by substantially covering the branch feeder brake lines and sealing the brake units from small rocks and other debris that could damage the feeder brake lines or seals in the units, yet permits the easy access to the units for servicing without having to remove the wheel. Each disc brake cover, for each wheel, comprises a circular flat plate with a cylindrical wall projecting into the hub of the wheel and surrounding the three disc brake units mounted to the radial flange on the wheel axle housing. The circular plate is provided with a diametrically extending slot, which cuts through the cylindrical wall, and permits mounting the cover over the axle housing against the radial flange. Four spacer tubes are mounted to the circular plate inside the cover and align with two pairs of holes provided in the plate for accommodating mounting bolts. Each of the disc brake units has two mounting pads, one on opposite sides of the brake lining assembly, each of which is provided with two sets of threaded holes with centers on two concentric circles which align with two concentric bolt hole circles on the radial flange. The two pairs of mounting holes in the cover plate also have their centers on two similar concentric circles and are positioned so that the one pair of holes on the outermost circle axially align with one threaded hole in each pad of the one main disc brake unit, also on the outermost circle, and that the second pair of holes on the innermost circle axially align with one threaded hole on the innermost circle in only one pad of each of the two servo disc brake units, which are the pads immediately adjacent to the two pads of the main disc brake unit. The radial flange on the axle housing is provided with a plurality of mounting holes on the two concentric bolt hole circles. The holes on the innermost circle on the pads, radial flange and the cover plate are slightly staggered from the holes on the outermost circle. The main disc brake unit is mounted to the radial flange such that the brake lining assembly arcs across the upper 120° circular portion of the disc and the two servo disc brake units are mounted to the radial flange such that their brake lining assemblies flank the main disc brake lining assembly and arc across the lower right and left 120° portions of the brake disc. Two servo brake feeder lines extend from the main disc brake unit and pass downwardly across the external side of the radial flange on diametrical opposite sides of the axle housing and connect to their respective servo disc brake units. Each disc brake unit has a bleeder valve means which projects outwardly over the top of the periphery of the radial flange.

Mounting bolts pass through the holes in the radial flange and thread into the threaded holes in the pads with the exception of the four threaded holes reserved for the mounting of the protective cover. The four spacers inside the protective cover provide a clearance space between the cover and the flange for the two feeder brake lines and for the bolt heads fastened against the flange. Four bolts, which are longer than the twenty disc brake unit mounting bolts, pass through the holes in the cover plate and through the spacer tubes and through the holes in the flange and thread into the four reserved holes and mount the protective disc brake cover to the flange, substantially covering the two feeder brake lines and aligning the three bleeder valve openings respectively with the three bleeder valve means on the disc brake units.

In the event that it is necessary to service one or more of the multiple disc brake units, the four longer cover plate mounting bolts are first removed and the cover plate is moved away from the circular flange exposing the two feeder lines and twelve previously covered disc brake unit mounting bolts. All twenty disc brake mounting bolts still hold their respective disc brake units fastened to the flange. All or a certain selected disc brake unit may now be removed for servicing by unfastening the shorter disc brake unit mounting bolts from the threaded holes in the mounting pads associated with those bolts. The diametrical slot in the cover plate normally exposes the eight bolts mounting the lowermost adjacent pads of the two servo brake units. The three bleeder valve openings permit the bleeding of the brake lines without having to remove the cover plate.

It is to be understood that the cover plate of my invention is not limited to wheels with multiple disk brake units but also applies to wheels having single disc brake units.

The various figures in the accompanying drawing illustrate a suitable arrangement for a constructive practice of my invention, wherein:

FIG. 1 is a cross-section of a tractor loader wheel having multiple disc brake units in combination with the cover plate of the invention;

FIG. 2 is a view taken in the direction of arrows 2—2 in FIG. 1;

FIG. 3 is an inner view of the cover plate; and

FIG. 4 is a side view of FIG. 3.

The disc brake cover assembly 20 is generally cylindrical in shape and has a open end, which fits over an annular flange 12, and a notched closed end, which fits over a tractor wheel axle housing 10 and is connected to the flange 12. The closed end is a circular metal plate 21 which has two pairs of mounting holes 23 and 25 and associated pairs of internal spacer tubes 27 and 28, each pair of mounting holes and associated tubular spacers are respectively located with centers on two concentric inner and outer circles 24 and 26, which coincide with two concentric mounting bolt hole circles 13 and 14 on the flange 12, when the cover assembly 20 is fitted against the flange 12. A diametrically extending U-shaped notch 30 is provided in the circular plate 21 for fitting the circular plate 21 over the wheel axle housing 10. A metal band 22 is fixed to the periphery of the circular plate 21 and forms a cylindrical wall structure extending from one edge 31 of the opening of the U-shaped notch 28 to the opposite edge 32 of the opening. At the middle of the arcuate portion 33 of the U-shaped notch 30, a clearance groove 34 is provided for the main hydraulic brake line 15, which runs through a channel 11 in the wheel axle housing 10. Three bleeder valve access openings 34', 35 and 36 are provided in the circular plate 21, which align with respective bleeder valve means 37, 38 and 39 associated with each of the three disc brake units 16, 17 and 18. Ten identical inner circle mounting bolts 41 are ten identical outer circle mounting bolts 42 pass through inner circle holes 43 and outer circle holes 44 in the flange 12 and thread into the threaded holes 45 and 46 provided in the disc brake unit mounting pads, also located on inner and outer concentric circles 13 and 14. Two identical inner circle cover plate mounting bolts 47 and two identical outer circle cover plate mounting bolts 48 mount the disc brake protective cover plate to the annular flange 12. The disc plate cover plate assembly 20, when it is mounted to the annular flange 12 protectively covers the main brake line 15 running to the main disc brake unit 16 and the two feeder lines 51 and 52 respectively connected to the servo brake units 17 and 18. In order to service the disc brake units, the four external cover plate mounting bolts 48 and 47 are removed and the disc brake cover plate assembly 20 removed from the wheel axle housing 10, exposing the remainder of the disc brake unit mounting bolts 41 and 42, and the two feeder lines 51 and 52.

What is claimed is:

1. In a tractor loaded vehicle having wheels equipped with multiple air-over-hydraulic, external dry caliper disc brake units, wherein two disc brake units are fluid connected to a main disc brake unit by tubing extending along an external side of a radial brake unit mounting flange on a wheel axle housing and each brake unit having brake fluid bleeder means for bleeding hydraulic brake fluid from the units, a disc brake protective cover comprising:

a circular flat plate member having a cylindrical wall projecting into a hub region of the wheel and surrounding the three disc brake units mounted to the radial flange on the wheel axle housing, the circular plate member having a diametrically extending slot cutting through the cylindrical wall and mounted over the axle housing;

four spacer tubes mounted to the circular plate member inside the cylindrical wall; and four mounting bolt means extending through respective holes provided in the circular plate member axially aligning with the spacer tubes for mounting the protective cover to the radial flange, the holes in the circular plate member and the four spacer tubes being positioned to the circular plate member, two each with centers on an inner circle and two each with centers on a concentric outer circle, and the radial flange being provided with inner and outer bolt holes with centers on inner and outer bolt hole circles coinciding with the inner and outer circles of the circular plate member and having four bolt holes axially aligning on the centers of the circular plate member holes and associated spacer tubes.

2. The invention according to claim 1, wherein:
the disc brake units are provided with mounting pads having threaded holes with centers on inner and outer circles corresponding to the inner and outer circles of the radial flange and circular plate member, and wherein at least two threaded holes with centers on the outer circle and two threaded holes with centers on the inner circle are reserved for the four mounting bolt means.

3. The invention according to claim 2, wherein:
the main disc brake unit has two mounting pads each of which receive one of the mounting bolt means and the other two disc brake units each have only one pad of two pads which receive one mounting bolt means.

4. The invention according to claim 3, wherein:
three openings are provided in the circular plate member aligning with the brake fluid bleeder means associated with each of the disc brake units.

* * * * *